United States Patent [19]

Caracappa

[11] 4,370,726
[45] Jan. 25, 1983

[54] SIGNAL CORRELATION MEANS EMPLOYING CHARGED-COUPLED DEVICE TYPE SHIFT REGISTERS

[75] Inventor: Michael G. Caracappa, Haddonfield, N.J.

[73] Assignee: RCA Corporation, New York, N.Y.

[21] Appl. No.: 172,212

[22] Filed: Jul. 25, 1980

[51] Int. Cl.³ .......................................... G06F 15/34
[52] U.S. Cl. .................................. 364/604; 364/728
[58] Field of Search ............... 364/484, 487, 604, 728, 364/602; 179/84 VF

[56] References Cited

U.S. PATENT DOCUMENTS

| | | | |
|---|---|---|---|
| 3,987,292 | 10/1976 | Means | 364/604 X |
| 4,088,960 | 5/1978 | Osborne | 179/84 VF X |
| 4,097,844 | 6/1978 | Moyer | 364/728 X |
| 4,100,378 | 7/1978 | Claasen et al. | 179/84 VF |
| 4,120,035 | 10/1978 | Cases et al. | 364/602 |
| 4,161,033 | 7/1979 | Martinson | 364/604 X |
| 4,224,679 | 9/1980 | Nossen et al. | 364/728 |
| 4,295,204 | 10/1981 | Sunstein | 364/604 X |

*Primary Examiner*—Felix D. Gruber
*Attorney, Agent, or Firm*—Samuel Cohen; Joseph S. Tripoli; Donald W. Phillion

[57] ABSTRACT

A system for correlating a sampled received analog signal against a sampled reference waveform which is approximated by three quantized levels. The three levels are organized to minimize undesirable odd harmonics with the reference and to maximize the correlator output signal-to-noise ratio. The invention comprises first and second signal summers and first, second and third registers each having M corresponding stages and logic for generating and entering into the first, second and third registers, respectively, a quantized form of the received signal, at least one two-level reference signal, and at least one two-level enable signal corresponding to the at least one two-level reference signal. Further logic responds to the contents of corresponding single stages of the second and third registers to supply the sampled contents of the corresponding stage of the first register to the first signal summer when the corresponding single stages of the second and third registers both contain first logic level signals, to gate the sampled contents of the second signal summer when the corresponding single stages of the second and third registers contain second and first logic level signals, respectively, and to gate the sampled contents to neither signal summing means when the corresponding stage of the third register contains a second logic level signal.

8 Claims, 4 Drawing Figures

SIGNAL CORRELATION MEANS EMPLOYING CHARGED-COUPLED DEVICE TYPE SHIFT REGISTERS

The Government has rights in this invention under Contract No. DAAB07-78-C-2976 awarded by the Department of the Army.

This invention relates generally to means for correlating a received signal with a reference signal and more particularly to such a correlating means wherein the received signal is sampled and stored in a charge-coupled device (CCD) functioning as a shift register.

In correlating means employing CCD shift registers the amplitude of the received signal is sampled at periodic intervals and the samples entered continuously into a CCD type shift register. The contents of the stages of the CCD shift register are then compared with a reference signal whose frequency is represented by a pattern of binary 1's and 0's stored in a reference signal register, each bit of the reference signal being compared with each sample of the received signal stored in the CCD shift register. The pattern of 1's and 0's of the reference signal are employed basically to gate all of the samples stored in the CCD shift register to either a positive summing bus or a negative summing bus, i.e. a two level gating function. More specifically, binary 1's in the reference signal gate the corresponding samples of the received signal in the CCD shift register onto the positive summing bus and binary 0's gate the corresponding samples of the received signal onto the negative summing bus. As a simple illustration assume that the CCD shift register has 256 stages therein and that it contains one cycle of a received signal or tone. Thus the one cycle of the received signal will be represented by 256 samples in the CCD shift register, 128 being positive and 128 being negative, assuming the received signal to be basically a sine wave. The reference signal or tone to be correlated with the stored received signal will consist of 128 binary 1's followed by 128 binary 0's. Maximum correlation occurs when the 128 binary 1's of the reference signal correspond with the 128 positive samples of the stored received signal and the 128 binary 0's of the reference tone correspond to the 128 negative samples of the received signal.

Certain problems are inherent in the foregoing arrangement. As has been long established in the engineering discipline of communication theory, the optimum arrangement for detecting a known signal in additive noise is the matched correlation receiver. This receiver maximizes the signal-to-noise ratio at the correlator output by correlating the received signal against a reference signal which is a perfect replica of the received signal except possibly for a constant scale factor. In the foregoing arrangement the reference signal, being restricted to a two-level waveform because of hardware considerations, poorly approximates the optimum sinusoidal waveform. Relative to the optimum sinusoidal reference waveform the two-level square wave reference signal results in a degraded output signal-to-noise ratio and correspondingly less reliable performance in determining which tone is present in the signal register. More specifically, the reference signal, being a two-level square wave, contains all odd harmonics of the fundamental tone which it represents. This being the case, if the received tone stored in the CCD shift register happened to be equal in frequency to the third (or fifth, seventh, etc.) harmonic of the reference tone, a large false correlation will result. In certain applications this spurious correlation between signals of different frequencies would degrade the system's performance. An example of such an application is a system designed to determine the frequency of the received signal when that frequency could be any one of N possibilities and some of the possible frequencies equal the third (fifth, seventh, etc.) harmonic of other possible frequencies.

Furthermore, the signal-to-noise ratio of the received fundamental tone is substantially less near the zero voltage crossover points of the fundamental tone of the received signal than it is during maximum peak values of said received tone. It is desirable to gate the stored samples of the received signals to the positive and negative buses in such a manner that the signal samples near the zero crossing points, which are relatively more corrupted by random noise, will contribute less to the comparison than the other stored samples of the received signal which stand out above the noise. The structure of the present invention in fact minimizes the spurious correlations due to odd harmonics enhances the signal-to-noise ratio, subject to certain constraints which will be described herein.

BRIEF SUMMARY OF THE INVENTION

In accordance with a preferred form of the invention there is provided first and second signal summers and first, second, and third registers each having M corresponding stages. Logic is provided for generating and entering into the first, second and third registers, respectively, quantized samples of the received signal, at least one two-level reference signal, and at least one two-level enable signal, with each bit position corresponding to the equivalent bit position in the two-level reference signal. Further logic means responds to the contents of corresponding single stages of the second and third registers to supply the quantized contents of the corresponding stage of the first register to the first signal summer when the corresponding single stages of the second and third registers both contain first logic level signals, to gate the quantized contents to the second signal summer when the corresponding single stages of the second and third registers contain second and first logic level signals, respectively, and to gate the quantized contents to neither signal summers when the corresponding stage of said third register contains a second logic level signal.

DETAILED DESCRIPTION OF THE INVENTION

Figure 2:
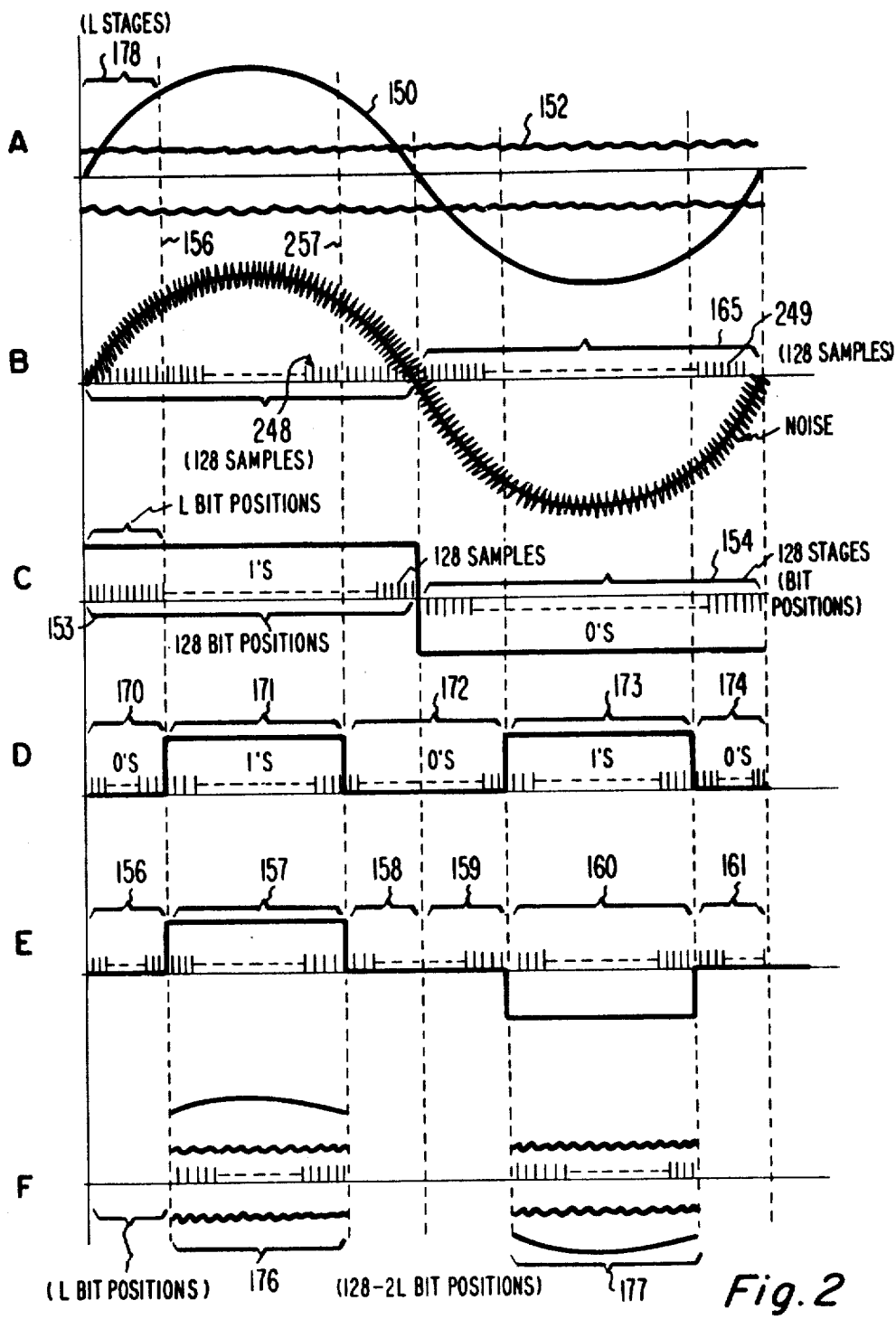
FIG. 2 is a set of waveforms illustrating the operation and principles of the invention.

In describing the invention the waveforms of FIG. 2 will be referred to as waveform 2A, 2B . . . 2E, for example, rather than waveform A of FIG. 2. Similar notations will be employed with respect to the waveforms of FIG. 3.

Figure 1:
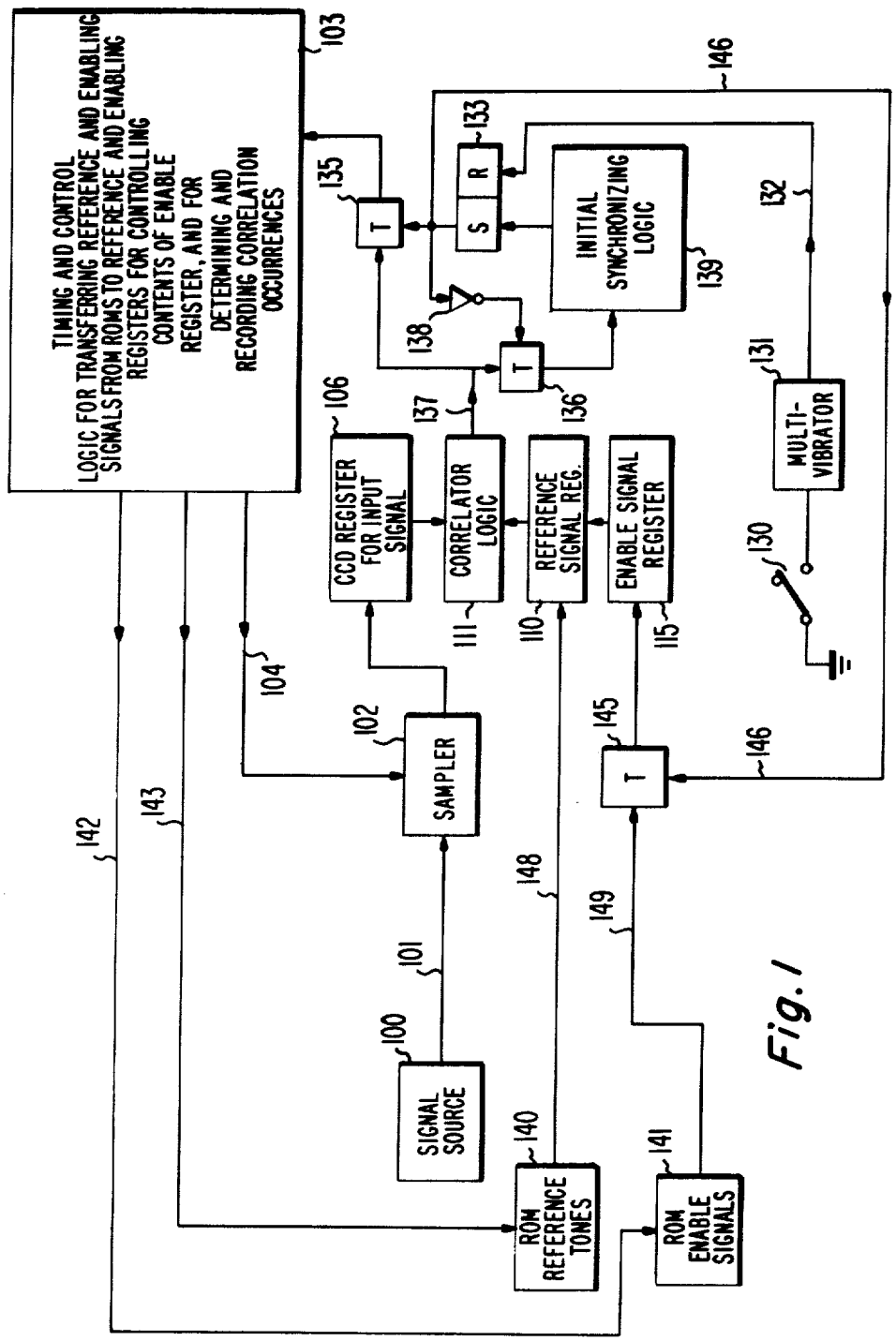
FIG. 1 is a functional block diagram of a system for implementing the invention.

Referring now collectively to FIGS. 1 and 2 the general organization of the invention will be described. In FIG. 1 a signal source 100 generates a signal having the components shown in waveform 2A which consists of a fundamental tone 150, assumed to be the desired tone whose frequency is to be determined, and some noise 152. The two components of waveform 2A combine to form the signal of waveform 2B which appears on output 101 of signal source 100. A sampling means 102, under control of timing pulses supplied from timing source 103 on lead 104, functions to sample the signal of waveform 2B and to enter such samples into shift register 106 which can be a charge-coupled device. The signal appearing on output lead 101 of signal source 100 can be a continuous signal comprised of time synchronous segments known as symbols wherein each successive symbol is of equal and contiguous time intervals. Assume the particular symbol supplied from signal source 100 is signal 150 of waveform 2A accompanied by the undesired noise component 152. Assume further that the CCD shift register 106 contains 256 stages and has a sampling rate $f_s$ such that the single cycle of signal 150 shown in waveform 2A is divided into 256 samples to just fill the 256 stages of CCD shift register 106 (FIG. 1). It is apparent that the CCD register 106 will store two cycles of a received symbol or tone segment having twice the frequency of signal 150 of waveform 2A.

Waveform 2B, while shown as a continuous signal, is actually comprised of 256 samples identified symbolically by the short vertical lines 148 and 149 and which are stored in the 256 stages of CCD register 106.

A two level reference or gating signal of the type employed in the prior art is shown in waveform 2C and represents a digitized signal which would be stored in 256 stage reference signal register 110 of FIG. 1. Waveform 2C comprises 256 bits with the first 128 bits 153 being binary 1's and the second 128 bits 154 being binary 0's. Each of the 256 bit position stages of the reference signal 110 corresponds to a unique one of the 256 stages of the CCD register 106. As will be discussed in more detail later herein in connection with FIG. 4 the correlator logic 111 of FIG. 1 functions to respond to the binary 1's of waveform 2C to gate the contents (the samples) of the corresponding stages of CCD register 106 onto a positive summing bus which will sum together all of the voltages represented by the 128 samples 155 of waveform 2B. Similarly, correlator logic 111 will respond to the 128 binary 0's represented by reference character 154 of waveform 2C to gate all of the signals of the 128 samples identified by reference character 165 of waveform 2B onto a negative summing bus.

The binary 1's of the reference signal of waveform 2C are shown aligned with the positive half-cycle of waveform 2B and the binary 0's are shown aligned with the 128 negative samples of waveform 2B so that all positive samples are gated to the positive summing bus and all negative samples are gated to the negative summing bus.

Figure 4:
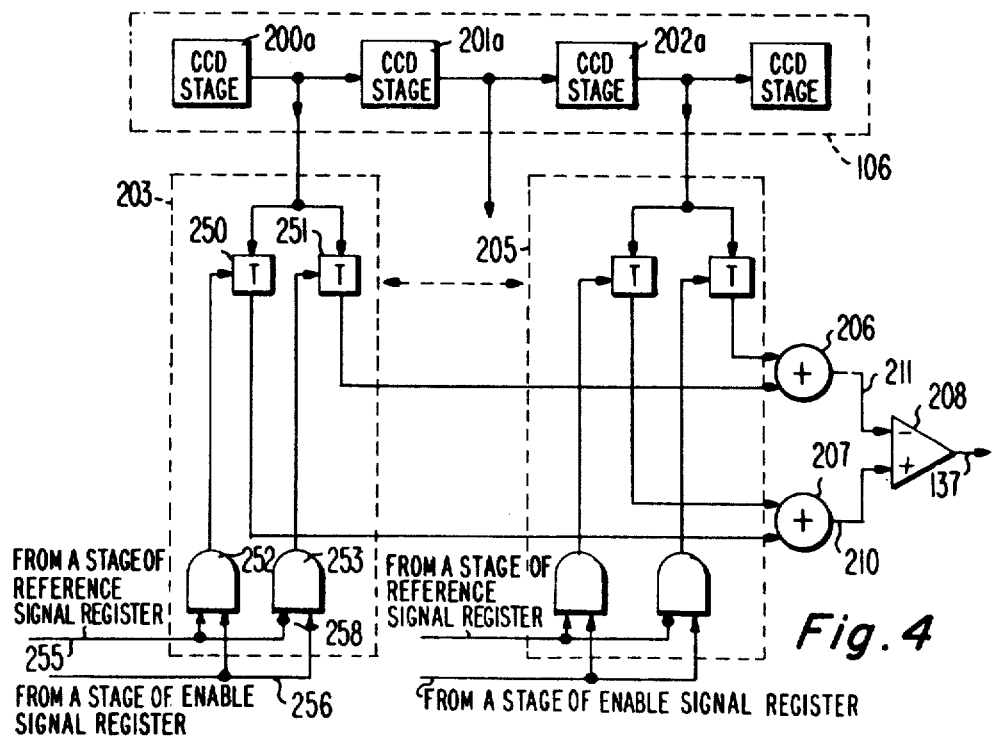
FIG. 4 is a logic diagram of the invention.

Since the negative samples on the negative summing bus are supplied to the negative port of difference amplifier 208 in FIG. 4, the two negatives become positive so that the magnitude of the correlation value equals the sum of the samples of a full-wave rectified version of the received signal. That is to say, one may imagine that the negative half of the received signal is flipped over to the positive side of the time axis and all the samples are then summed.

It is to be understood that even though this discussion uses the simplifying assumption, for ease of explanation, that the phase of the received tone is as shown in waveform 2A, in fact the claims appended hereto also apply to a non-coherent receiver in which I and Q correlators process the received tone whose absolute phase is unknown and not significant.

In the foregoing discussion it has been assumed that the signal represented by waveform 2B is contained in CCD register 106 (FIG. 1) and the reference signal waveform 2B is contained in reference signal register 110. The logic means by which the signals of waveforms 2A and 2C become so contained in registers 106 and 110 will be discussed later herein in connection with a more detailed discussion of FIG. 4. For the time being it is assumed that the signals of waveforms 2A and 2C are stored statically in the CCD register 106 and reference signal register 110.

It can be seen that when correlator logic 111 responds to the two level reference signal of waveform 2C the entire 256 samples of waveform 2B will be gated to one or the other of the positive and negative summing buses of the system. An examination of waveform 2B shows that the signal-to-noise ratio of waveform 2B is very small near the zero voltage crossover point thereof and is largest in the center portion of the two half-cycles of waveform 2B. For example the portion of the positive half-cycle of waveform 2B between the dotted lines 156 and 157 has a much higher signal-to-noise ratio than the portions of the positive portion of waveform 2B lying outside the dotted lines 156 and 157.

It is desirable when performing the correlation to give the most weight to those samplings lying between the dotted lines 156 and 157. The dotted lines 156 and 157 are more or less arbitrarily drawn in waveform 2B and the distance therebetween can be increased or decreased to accommodate various design and signal characteristics. The precise positioning of dotted lines 156 and 157 is subject to mathematical analysis and dependent upon several parameters as will be shown herein.

To mitigate the two deleterious effects discussed above the invention employs a three-level gating reference tone as shown in waveform 2E rather than that two level gating signal of waveform 2C. In waveform 2E the positive portion 157 consists of binary 1's, the negative portion 160 consists of binary 0's, and the portions 156, 158, 159 and 161 function to prevent the gating of the samples in the corresponding stages of CCD register 106, such as the L stages 178 of waveform 2A, from being gated to either the positive or the negative summing bus of correlator logic 111. Thus the samples corresponding to portions 156, 158, 159 and 161 of waveform 2E are not utilized in the system in generating the correlation pulse.

Waveform 2E is obtained by taking the product of waveforms 2C and 2D. Waveform 2C has been described above as being a two level gating signal which normally would gate the entire 256 samples of the received signal of waveform 2B to the two summing buses. However, by logic to be described in connection with FIG. 4 the gating signal of waveform 2C functions as a gating signal only during those times that waveform 2D contains binary 1's. Thus, during portions 171 and 173 of waveform 2D, which in its entirety consists of 256 bits contained in enable register 115 of FIG. 1, the stored samples in CCD register 106 of FIG. 1 will be gated onto either the positive or negative summing buses of FIG. 4. During portions 170, 172 and 174 of waveform 2D, which contain all binary 0's, waveform 2C will be prohibited from gating the samples in the corresponding stages of CCD register 106 to either the positive or negative bus summing means. Waveform 2E shows the effective gating function resulting from combining waveforms 2C and 2D as discussed above.

It will be shown in the mathematical analysis to follow herein that the effective gating function 2E can be constructed so as to minimize certain of the odd harmonics which would be present in square wave gating function waveform 2C. This results in better performance because (1) spurious correlations are lower in amplitude and (2) the output signal-to-noise ratio is larger. Accordingly, the performance of the correlative process is greater than that obtainable with prior art techniques.

The CCD register 106 and the correlator logic 111 of FIG. 1 is shown in more detail in FIG. 4 wherein the logic within the dotted line 106 represents four stages of the 256 stages of CCD register 106 of FIG. 1 and the logic within the dotted lines 203 and 205 represent two stages of the correlator logic 111. It is to be understood there are 256 stages of correlator logic 111 which correspond to the 256 stages of CCD register 106 and reference signal register 110.

Consider now the logic within dotted block 203. When a given stage of reference register 110 (FIG. 1) contains a binary 1 and the corresponding stage of enable register 113 also contains a binary 1 then AND gate 252 (FIG. 4) is enabled to supply a binary 1 to TRANSMISSION gate 250 thereby enabling TRANSMISSION gate 250 to supply the contents of CCD register stage 200a therethrough to summer 207, the output of which is supplied via positive signal summing bus 210 to the positive input of difference amplifier 208.

AND gate 253, however, is disabled because of the inhibit input 258 thereof which inverts the binary 1 thereon from reference register 110 (FIG. 1) to a 0. Thus TRANSMISSION gate 251 is disabled to prevent the output of stage 200a (of CCD register 106 of FIG. 1) from being supplied to summing means 206.

If the corresponding stage of enable register 115 (FIG. 1) contains a binary 0 then both AND gates 252 and 253 are disabled by a 0 on lead 256, thus preventing any output signal from being supplied to either summer 206 or 207. The output of difference amplifier 208 will therefore be zero voltage.

From the foregoing discussion it is evident that waveform 2E does in fact represent a three level gating signal in which binary 1's are outputted from one of the AND gates 252 or 253 during the portions 157 and 160 thereof and in which binary 0's are outputted from both of the AND gates 252 and 253 during the periods 156, 158, 159 and 161 thereof. As discussed above the signal of waveform 2C combines with the signal of waveform 2D to form the signal of waveform 2E. More specifically the portions 171 and 173 of waveform 2D, which contain binary 1's, will prime one of AND gates 252 or 253 depending upon whether the corresponding bits contained in reference register 110 are binary 1's or binary 0's, as shown in waveform 2C. During portions 170, 172 and 174 of waveform 2D, which contain binary 0's, both AND gates 252 and 253 are disabled.

As mentioned above there are 256 correlation stages, such as stages 203 and 205, in correlator 111 and the discussion re stages 203 and 205 is also applicable to the other 254 correlation stages, each of which functions to supply a signal to either of the signal summing buses 211 and 210 in accordance with the contents of corresponding stages of reference register 110 (FIG. 1) and enable signal register 115.

Figure 3:
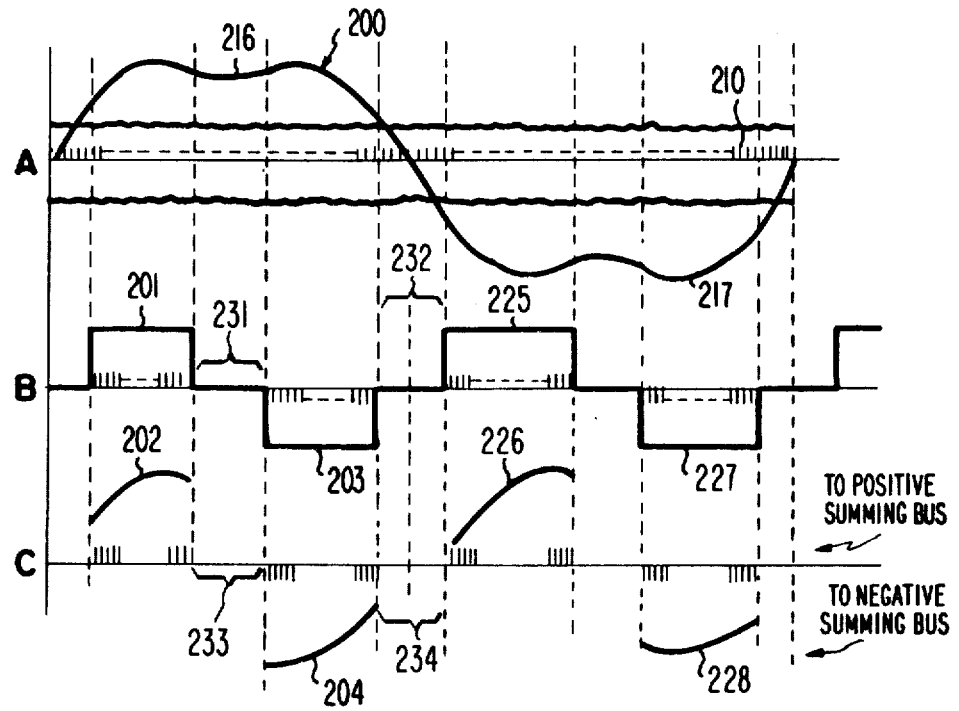
FIG. 3 is another set of waveforms further illustrating the operation of the invention.

Referring now to FIG. 3 there is shown an example where the three level gating signal of waveform 3B represents a reference tone of twice the frequency of the sample input signal 200 of waveform 3A, which consists of a positive half cycle 216 and a negative half cycle 217. The group of binary 1's 221 of waveform 3B functions to gate the samples contained in the corresponding stages of the CCD register 106 (FIG. 1) to the positive summing bus 210 (FIG. 4). Such samples are represented by envelope 222 of waveform 3C. However, the gating signals 223 of waveform 3B functions to gate the samples contained in the corresponding stages of the CCD register 106 (waveform 2A) to the negative summing bus 211 (FIG. 4). Such samples are represented by envelope 224 of waveform 3C. Since samples 224 are positive they will substantially cancel out the positive samples 222 supplied to the positive summing bus 210 (FIG. 4), due to the function of difference amplifier 208 of FIG. 4.

Similarly, gating signals 225 and 227 of waveform 3B will supply negative groups of samples 226 and 228, respectively, to the positive summing bus 210 and to the negative summing bus 211 of FIG. 4 so that they cancel each other. It is apparent that no significant correlation pulse will appear on the output terminal 137 of difference amplifier 208. Intervals 231, 232, 233 and 234 are periods where AND gates 252 and 253 are both disabled due to the presence of 0's in the enablement signal.

Referring to FIG. 1 the operation of the system is initiated by closing switch 130 which energizes multivibrator 131 to produce a pulse on output lead 132. Such pulse resets flip-flop 133 thereby disabling TRANSMISSION gate 135 and enabling TRANSMISSION gate 136 through inverter 138. The output of the correlator logic 111 is supplied through enabled TRANSMISSION gate 136 to the initial synchronization logic means 139.

The initial synchronization logic 139 detects a correlation pulse from correlator logic 111 which exceeds a predetermined threshold and in response thereto will set flip-flop 133, thereby enabling TRANSMISSION gate 135 and disabling TRANSMISSION gate 136. Accordingly, subsequent correlation pulses from correlator logic 111 will be supplied through TRANSMISSION gate 135 to timing and control logic 103 which controls the normal steady state operation of the system.

To establish initial synchronization of the system a predetermined reference signal and the corresponding enabling signal are supplied from ROMS 140 and 141 into reference signal register 110 and enable signal register 115, respectively. Such signals could be, for example, the signals of waveforms 2C and 2D. The received signal from signal source 100 is then sampled in sampling means 102 and entered into CCD register 106 until the particular tone corresponding to the reference signal of waveform 2C is received. Such received tone could be represented by waveform 2A, for example.

The correlator logic 111 responds to the foregoing event to generate a correlation pulse on its output lead 137 which is supplied through TRANSMISSION gate 136 to the initial synchronization logic 139 which responds thereto to set flip-flop 133 as discussed above.

Once synchronization has been obtained the timing and control logic 103 will function to supply reference tones and corresponding enable signals from ROMS 140 and 141 into the reference signal register 110 and the enable signal register 115 respectively in rapid sequence. Specifically, for example, if there are 64 possible input tones then there will be 64 reference tones and also 64 corresponding enable signals which must be entered into reference signal register 110 and enable signal register 115 during the time that each received input tone is contained in CCD register 106.

The details of such timing means and control means is not per se a part of the present invention. However a more complete discussion of such timing and control logic is set forth in co-pending application Ser. No. 172,214, filed concurrently herewith on July 25, 1980 by Michael Caracappa, entitled "System and Method for Frequency Discrimination," now U.S. Pat. No. 4,352,194, assigned to the same assignee as the present invention, and incorporated herein by reference.

The timing and control means 103 also functions to detect the largest correlation pulse during each comparison of the 64 reference tones with a received input tone and to record which reference tone produced the largest correlation pulse. The logic for accomplishing such detection and recording of the largest correlation pulse is also disclosed in the above-mentioned co-pending application.

The improvement in system performance when a three-level reference waveform replaces a two-level reference waveform can be expressed in mathematical terms. The Fourier series in expansion of the two-level square wave reference $R_2(t)$ of 2B may be written $$R_2(t) = \frac{4}{\pi}\left[ \underbrace{\sin 2\pi f_o t}_{\text{fundamental}} + \frac{1}{3} \underbrace{\sin 2\pi 3f_o t}_{\text{3rd harmonic}} + \frac{1}{5} \underbrace{\sin 2\pi 5f_o t}_{\text{5th harmonic}} + \ldots \right]$$

It is seen that $R_2(t)$ consists of the undesirable odd harmonics which fall off at the rate $1/n$. Thus, the third and fifth harmonics are down only 9.5 dB and 14 dB, respectively, relative to the fundamental. These odd harmonics are responsible for false, spurious correlations when the received tone equals the frequency of one of the harmonics.

The Fourier series expansion of the three-level reference waveform $R_3(t)$ of 2C may be written $$R_3(t) = \frac{4}{\pi}\left\{ \sum_{n=1}^{n=\infty} \sin\left(\frac{n\pi}{2}\right) \frac{\sin[n\pi(.5 - Z)]}{n\pi(.5 - Z)} \sin(2\pi n f_o t) \right\}$$

In this equation "Z" is the ratio of the length of the zero-level pedestal 172 of waveform 2D to one period of the tone. It is seen that the amplitudes of the odd harmonics are all functions of Z. Thus, by choosing Z appropriately, one can tailor the level of the odd harmonics to the application at hand. We have assumed that Z is symmetrically placed in the center of waveform 2D and that pedestals 170 and 174 of waveform 2D are each $Z/2$ in length. It would be a straight-forward exercise to plot the amplitude of each harmonic as a function of Z. Such a plot could be used to facilitate the appropriate choice of Z, depending on the characteristics of the particular application.

Additional mathematical analysis would reveal that the correlator output signal-to-noise ratio improvement of using a three-level approximation of a sinewave over a two-level approximation can be up to 1 dB, depending, to a slight extent, on the exact value for Z which has been selected.

Even though the discussion to this point has only dealt with received sinusoidal tones and reference waveforms which approximate sinewaves using three levels instead of two levels, this invention is not restricted to detecting sinusoidal waveforms. In fact, any system which employs a signaling waveform which can be closer approximated by a three-level waveform than by a two-level waveform would benefit from this invention.

In military anti-jam radio communication systems a waveform which is commonly employed is the quaternary phase-shift keyed (QPSK) pseudo-noise (PN) signal. This signal consists of two different two-level digital PN signals which phase modulate a carrier. In the optimum non-coherent receiver implementation, when the receiver down-converts the QPSK signal to baseband, the signal is split into I and Q components, with each component being match filter correlated against the analog sum of the two PN digital signals. Then the I and Q correlation outputs are each squared and added together. The point of the foregoing discussion is that the optimum correlator reference signal is the waveform which is the analog sum of two digital two-level PN signals. But the analog sum of two digital two-level waveforms is a three-level waveform, which can be readily synthesized according to the structures and principles set forth herein. Thus, a single correlator with a three-level reference waveform can replace the previous art techniques of providing two separate correlators, each matched to one of the PN signals, and means for combining the two outputs.

I claim:

1. A system for correlating the frequency of a quantized input signal with the frequency of a two level reference signal, comprising:

first and second signal summing means;

means for generating said two level reference signal and a two level enable signal;

first, second, and third registers for storing said quantized input signal, said two level reference signal, and said two level enable signal, respectively, and each having a plurality of corresponding stages;

logic means comprising a plurality of gating means each responsive to the contents of a given single corresponding stage of said second and third registers to gate the contents of said given stage of said first register to said first and second summing means, respectively, when the contents of said given stage of said second register is a first and second logic level, respectively, and the contents of said given stage of said third register is a first logic level, and to gate the contents of said given stage of said first register to neither summing means when the contents of said given stage of said third register is a second logic level; and means for combining the contents of said first and second summing means to produce an output signal indicative of the degree of correlation between said quantized input signal and said two level reference signals.

2. A system as in claim 1 in which the stages of said third register positioned near either side of zero voltage crossover points of said input signal contain second logic level signals and the remainder of said stages of said third register contain first logic levels.

3. A system as in claim 1 in which the stages of said third register corresponding to the stages of said first register having the expected lowest signal to noise ratio and having the largest expected components of the third harmonic of the fundamental frequency component of the received signal contain low logic level signals, and in which the remainder of the stages of said third register contain high logic level signals.

4. In a system for correlating the frequency of a received signal with the frequency of a two level reference signal:
  first and second signal summing means;
  first, second and third registers each having a plurality of corresponding stages;
  means for generating and entering into said first, second and third registers, respectively, a quantized form of said received signal, a two level reference signal, and a two level enable signal; and
  logic means responsive to the contents of corresponding single stages of said second and third registers to supply the quantized contents of the corresponding stage of said first register to said first signal summing means when said corresponding single stages both contain first logic level signals, to gate said quantized contents to said second signal summing means when said corresponding single stages contain second and first logic level signals, respectively, and to gate said quantized contents to neither signal summing means when the corresponding stage of said third register contains a second logic level signal.

5. In a system as in claim 4 in which the stages of said third register adjacent either side of zero voltage crossover points of said input signal contain second logic level signals and the remainder of said stages of said third register contain first logic levels.

6. In a system for correlating the frequency $f_r$ of a received signal with the frequency of a two-level reference signal:
  first and second signal summing means;
  first shift register means having M stages;
  first means for quantizing and then storing said received signal in said first shift register means;
  reference signal register means having M stages each corresponding to a stage of said input signal register means, where M is an integer greater than one;
  second means for generating and successively supplying to said reference signal register means at least one two level reference signal of frequency $f_r$;
  enable signal register means having M stages each corresponding to a stage of said input signal register means;
  third means for generating and supplying to said enable signal register means at least one two enable signal corresponding to said at least one two level reference signal;
  a plurality of gating means each responsive to the contents of corresponding single stages of said reference signal register means and said enable signal register means to gate the contents of the corresponding stage of said first shift register means to said first summing means when the stages of said reference and enable signal register means both contain first logic level signals, to gate said contents to said second summing means when the stages of said reference and enable signal register means contain second and first logic levels respectively, and to gate said contents to neither summing means when the corresponding stage of said enable signal register means contains a second logic level signal.

7. In a system as in claim 6 and further comprising:
  control means;
  and in which said first means responds to said control means to quantize said received signal into groups of M amplitude samples at a sampling rate $f_s$ and to successively enter said groups of M samplings into the M stages of said first shift register means;
  in which said second means responds to said control means to generate said two level reference signals and to enter them into said reference signal register at a rate not less than $Nf_s$, where N is the number of reference signals to be compared with said received signal;
  in which said third means responds to said control means to generate and enter said corresponding two level enable signal into said third register means substantially simultaneously with the entry of the corresponding two level reference signal into said second register means; and
  in which said control means responds to the output of said plurality of gating means to identify that two level reference signal which produced the largest correlation pulse signal when compared with said quantized received signal.

8. In a system as in claim 6 in which said first means produces enable signals in which the pattern of first and second logic levels has low logic levels in those stages corresponding to the contents of those stages of said first register containing distortive components above a predetermined threshold.

* * * * *